United States Patent

Yamada et al.

[11] Patent Number: 5,730,386
[45] Date of Patent: Mar. 24, 1998

[54] CABLE REEL

[75] Inventors: Minoru Yamada; Shin Sato, both of Kanuma, Japan

[73] Assignee: Sumitomo Electric Industries, Ltd., Osaka, Japan

[21] Appl. No.: 705,080

[22] Filed: Sep. 4, 1996

[30] Foreign Application Priority Data

Sep. 4, 1995 [JP] Japan .................. 7-226534

[51] Int. Cl.$^6$ .................. H01R 39/02
[52] U.S. Cl. .................. 242/388; 439/15
[58] Field of Search .................. 242/388, 388.1, 242/402; 191/12 R, 12.2 R, 12.2 A, 12.4; 439/13, 15, 162, 163, 164

[56] References Cited

U.S. PATENT DOCUMENTS

| | | | |
|---|---|---|---|
| 4,696,523 | 9/1987 | Schauer et al. | 439/15 |
| 4,744,763 | 5/1988 | Suzuki et al. | 439/15 |
| 4,927,365 | 5/1990 | Schauer et al. | 439/164 |
| 4,975,063 | 12/1990 | Ida et al. | 439/15 |
| 5,393,007 | 2/1995 | Urushibata | 242/532 |
| 5,547,144 | 8/1996 | Sakamoto et al. | 242/402 |

FOREIGN PATENT DOCUMENTS

| | | | |
|---|---|---|---|
| 0 482 936 A1 | 4/1992 | European Pat. Off. | 439/13 |
| 59-149276 | 8/1984 | Japan | 242/388.6 |
| 62-11147 | 3/1987 | Japan . | |
| 3-32076 | 7/1991 | Japan . | |
| 5-92983 | 12/1993 | Japan . | |
| 7-20868 | 5/1995 | Japan . | |

*Primary Examiner*—John P. Darling
*Attorney, Agent, or Firm*—Cushman Darby & Cushman IP Group of Pillsbury Madison & Sutro LLP

[57] ABSTRACT

A tape cable provided with connector portions in its end portions is wound spirally, and a reinforcing tape having elasticity is stuck to the outer circumferential surface of the tape cable in the vicinity of the connector portion. In an inner cylinder, in the vicinity of the end portion on the connector side of the reinforcing tape provided on the tape cable, a support portion is provided in a position to support the tape cable together with the reinforcing tape. When the connector portion is installed in the inner cylinder, the tape cable is inserted and held between the support portion and the inner cylinder together with the reinforcing tape. Accordingly an end portion of the reinforcing tape is fixed, so that buckling between the connector portion and the support can be prevented. Buckling beyond the portion can be prevented by the rigidity of the reinforcing tape.

14 Claims, 4 Drawing Sheets

(1)

CABLE REEL

BACKGROUND OF THE INVENTION

1. Field of the Invention

The present invention relates to a cable reel suitable for signal transmission in a rotary member such as a steering wheel or the like.

2. Description of the Related Art

For example, in the case where signal transmission is performed between the side of a handle and the side of a body in a car, a wire for connecting the handle side and the body side electrically needs to have a structure to absorb the rotation of the handle. FIG. 5 is a partially exploded perspective view of an example of a conventional cable reel. In the drawing, the reference numeral 1 represents an inner cylinder, 3 a tape cable, 7 an outer cylinder, and 11 a lock member. One of the inner and outer cylinders 1 and 7 is attached to the handle side, and the other is attached to the body side. The tape cable 3 is wound up spirally, and one end thereof is locked to the inner cylinder 1 while the other end is locked to the outer cylinder 7. In FIG. 5, the spiral inner end portion is locked to the inner cylinder 1 by the lock member 11, and its spiral outer end portion is locked to the outer cylinder 7. The outer cylinder 7 and the inner cylinder 1 are assembled rotatably, and the inner cylinder 1 and the tape cable 3 are stored in the outer cylinder 7. When the inner cylinder 1 and the outer cylinder 7 rotate relatively to each other, the tape cable 3 wound spirally is wound tightly or loose in the outer cylinder 7 so as to absorb the relative rotation.

FIG. 6 is an explanatory diagram of the buckling of a tape cable in the conventional cable reel. In the drawing, the reference numeral 21 represents a buckling portion. While the tape cable 3 is wound tightly and loose repeatedly in accordance with the relative rotation of the inner and outer cylinders 1 and 7, there is a case where the tape cable 3 buckles particularly in the portion where the tape cable 3 is locked to the inner cylinder 1 by the lock member 11, as shown as the buckling portion 21 in FIG. 6. With the buckling, the strength is reduced in the buckling portion, causing troubles such as breaking of the wire.

In order to solve this problem, for example, as disclosed in Japanese Utility Model Examined Publications No. Sho-62-11147, No. Hei-3-32076, or the like, it has been considered that a buckling preventing member made of an elastic body is provided and fixed to an inner cylinder, and a tape cable is put along this member so as to prevent buckling. However, in such a structure, it takes much labor to attach the buckling preventing member to the inner cylinder and wind the tape cable along the member spirally, and it is against a request to reduce the number of parts as much as possible, and rationalize the assembly. In addition, since the buckling preventing member is merely put along the tape cable, it is impossible to prevent buckling perfectly.

As disclosed in Japanese Utility Model Examined Publication No. Hei-7-20868, Japanese Utility Model Unexamined Publication No. Hei-5-92983, or the like, it has been also considered that a buckling preventing member made of an elastic body is bonded to a tape cable. However, in the structure disclosed in Japanese Utility Model Unexamined Publication No. Hei-7-20868, the buckling preventing member bonded to the tape cable is also fixed to an inner cylinder, so that it has been impossible to rationalize the assembly. In addition, in the structure disclosed in Japanese Utility Model Unexamined Publication No. Hei-5-92983, there is a possibility of buckling between an end portion of the buckling preventing member and the inner or outer cylinder.

SUMMARY OF THE INVENTION

It is an object of the present invention to provide a cable reel by which the labor of assembly or the number of parts is not increased, and buckling is prevented effectively.

A cable reel according to the present invention comprises: a housing having an inner cylinder and an outer cylinder; a tape cable spirally stored in the housing to absorb relative rotation by the winding tightness and winding looseness of the tape cable; a reinforcing tape having a predetermined shape is stuck on a predetermined position of the tape cable; and a supporting portion contacting with the reinforcing tape in a vicinity of the end portion of the reinforcing tape, the supporting portion being provided on at least one of the inner cylinder and the outer cylinder.

According to the present invention, it is not only possible to prevent buckling in the stuck portion of the reinforcing tape, but it is also possible to prevent buckling of the tape cable in the vicinity of the end portion of the reinforcing tape effectively. It is therefore possible to improve the reliability and durability of the cable reel.

DETAILED DESCRIPTION OF THE INVENTION

Detailed description of the present invention will be described with reference to the accompanying drawings.

Figure 1:
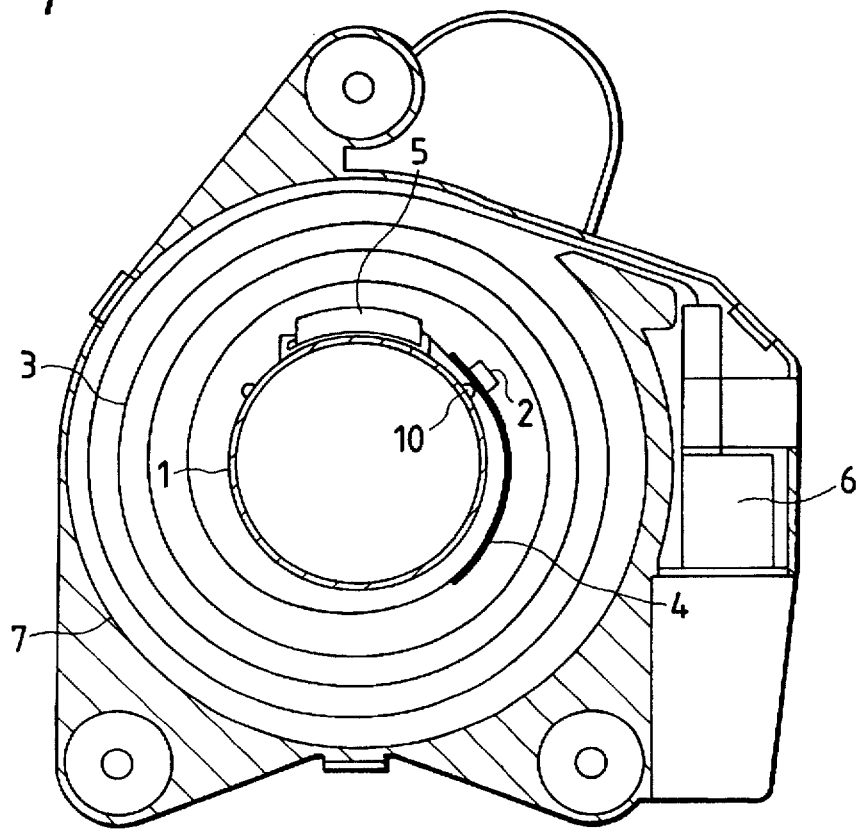
FIG. 1 is a sectional view illustrating an embodiment of a cable reel of the present invention.
Figure 2:
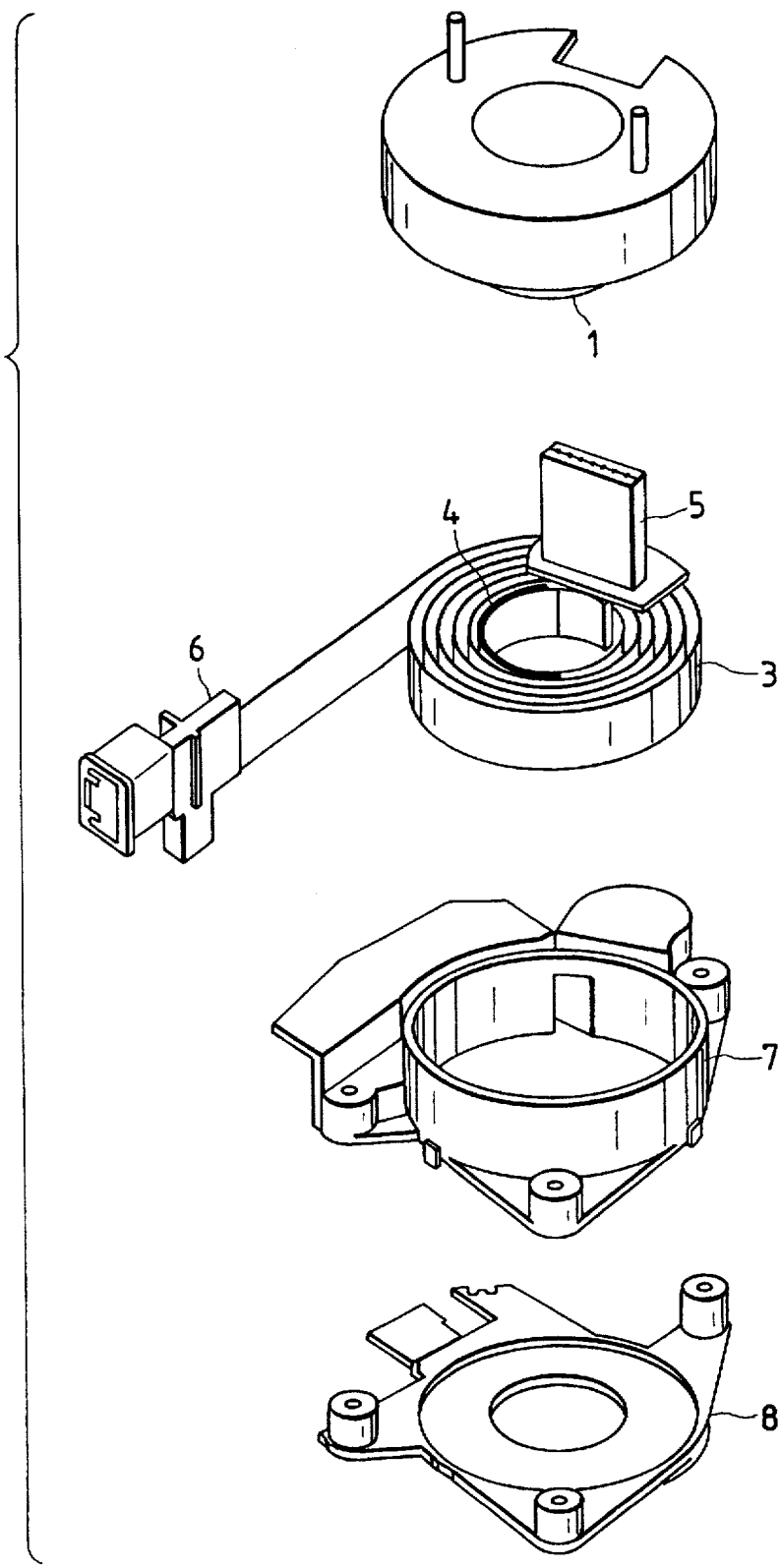
FIG. 2 is an exploded perspective view illustrating the embodiment of a cable reel of the invention.

FIG. 1 is a sectional view illustrating an embodiment of a cable reel according to the present invention. FIG. 2 is an exploded perspective view of FIG. 1. In the drawings, the reference numeral 1 represents an inner cylinder, 2 a support portion, 3 a tape cable, 4 a reinforcing tape, 5 and 6 connector portions, 7 an outer cylinder, and 8 a outer cylinder cover. The inner cylinder 1 has a cylindrical portion on the outer circumference of which the tape cable 3 is wound, and a hole portion to which the connector portion 5 of the tape cable 3 is inserted and fixed. In addition, the support portion 2 is provided for holding the tape cable 3 in cooperation with the cylindrical portion of the inner cylinder 1. This support portion 2 is disposed in the vicinity of the end portion on the connector 5 side of the reinforcing tape 4 provided on the tape cable 3 so that the support portion 2 can support the tape cable 3 in cooperation with the reinforcing tape 4. A convex portion may be provided on the cylindrical portion of the inner cylinder 1 oppositely to the support portion 2.

The outer cylinder 7 has an approximately cylindrical hollow portion therein, and the tape cable 3 and the inner cylinder 1 are stored in this hollow portion. In addition, the outer cylinder 7 has a portion to fix the connector portion 6 of the tape cable 3. Further, the outer cylinder cover 8 is attached to the lower portion of the outer cylinder 7.

The tape cable 3 is wound spirally, and one end thereof has the connector portion 5 to be fixed to the inner cylinder 1 while the other end has the connector portion 6 to be fixed to the outer cylinder 7. Further, in this embodiment, the reinforcing tape 4 is stuck to the outer circumferential surface of the tape cable 3 in the vicinity of the connector portion 5. This reinforcing tape 4 is made of elastic material, but has more rigidity than the tape cable 3, so that the buckling of the tape cable 3 can be prevented. The reinforcing tape 4 may be stuck to the tape cable 3 by a certain length, and need not be stuck all over the tape cable 3.

Figure 3A:
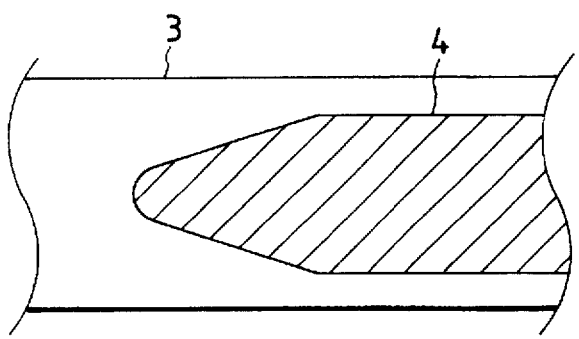
FIG. 3A and 3B are explanatory diagrams of examples of the shape of a reinforcing tape in the embodiment of a cable reel of the invention.
Figure 3B:
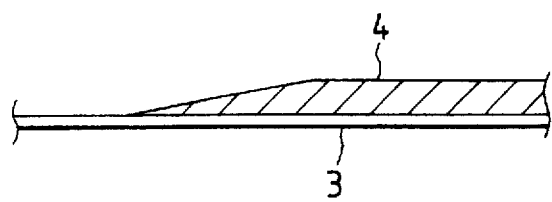

FIG. 3 is an explanatory diagram of an example of the shape of the reinforcing tape. The reinforcing tape 4, for example, may be tapered to be narrower gradually as shown in FIG. 3. Alternatively, the reinforcing tape 4 may be tapered to be thinner gradually as goes from the side of the connector portion 5 toward the connector 6.

Figure 4:
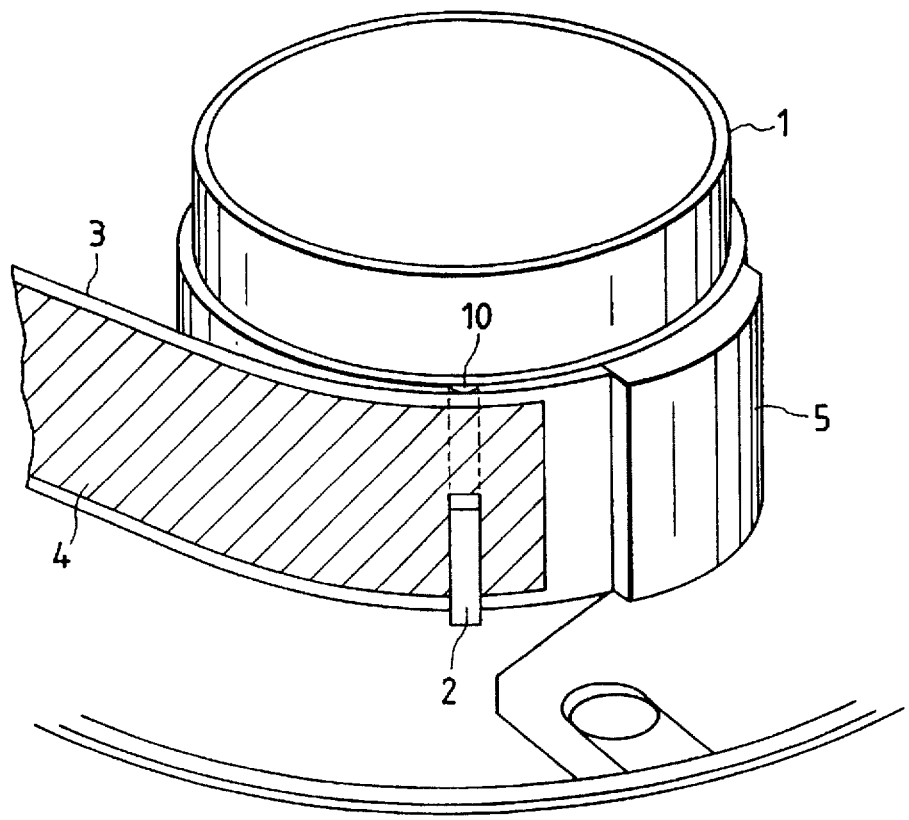
FIG. 4 is a main portion expanded view illustrating the embodiment of a cable reel of the invention.
Figure 6:
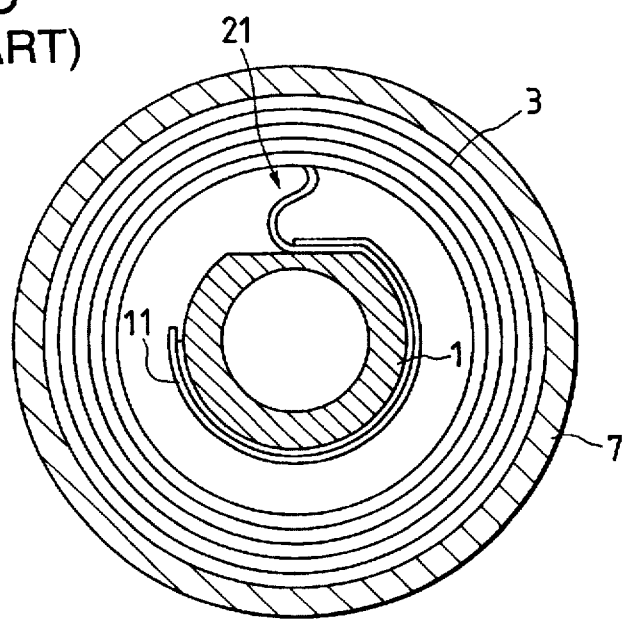
FIG. 6 is an explanatory diagram of the buckling of a tape cable in the conventional cable reel.

FIG. 4 is a main portion expanded diagram illustrating the embodiment of a cable reel according to the present invention. When the connector portion 5 of the tape cable 3 is attached to the inner cylinder 1, the tape cable 3 is inserted between the support portion 2 provided in the vicinity of the attached position and the cylindrical portion of the inner cylinder 1. In this drawing, a projection 10 is formed on the cylindrical portion of the inner cylinder 1, and the support portion 2 is provided in the portion opposite to this projection 10. However, it is not always necessary to provide the projection 10. With the support portion 2 provided, the neighborhood of the end portion on the connector portion 5 side of the reinforcing tape 4 stuck to the tape cable 3 is also held between the support portion 2 and the cylindrical portion of the inner cylinder 1 together with the tape cable 3 as shown in FIG. 4. Therefore, the position of the tape cable 3 is restricted between the support portion 2 and the connector portion 5, so that there is no fear that buckling arises. In addition, also beyond the support portion 2, the turn-over of the tape cable 3 as shown in FIG. 6 is restricted by the rigidity of the reinforcing tape 4, so that there is no fear that the tape cable 3 is bent, so that buckling can be prevented sufficiently.

[0015]

It is not always necessary to firmly hold the neighborhood of the end portion of the reinforcing tape 4 between the support portion 2 and the cylindrical portion of the inner cylinder 1 together with the tape cable 3. The distance between the support portion 2 and the cylindrical portion of the inner cylinder 1 may be larger than the total thickness of the tape cable 3 and the reinforcing tape 4. In this case, the tape cable 3 and the reinforcing tape 4 are held loosely between the support portion 2 and the cylindrical portion of the inner cylinder 1. Accordingly, it is easy to insert the tape cable 3 and the reinforcing tape 4 between the support portion 2 and the cylindrical portion of the inner cylinder 1. Although the neighborhood of the end portion of the reinforcing tape 4 is not fixed to the cylindrical portion of the inner cylinder 1, the neighborhood of the end portion of the reinforcing tape 4 is prevented from swelling outside by the support portion 2. Consequently, the support portion 2 acts as a stopper. It is therefore possible to prevent buckling effectively. It is therefore unnecessary to hold the neighborhood of the end portion of the reinforcing tape 4 tightly by the support portion 2, and the support portion 2 may be disposed to have enough gap.

Figure 5:
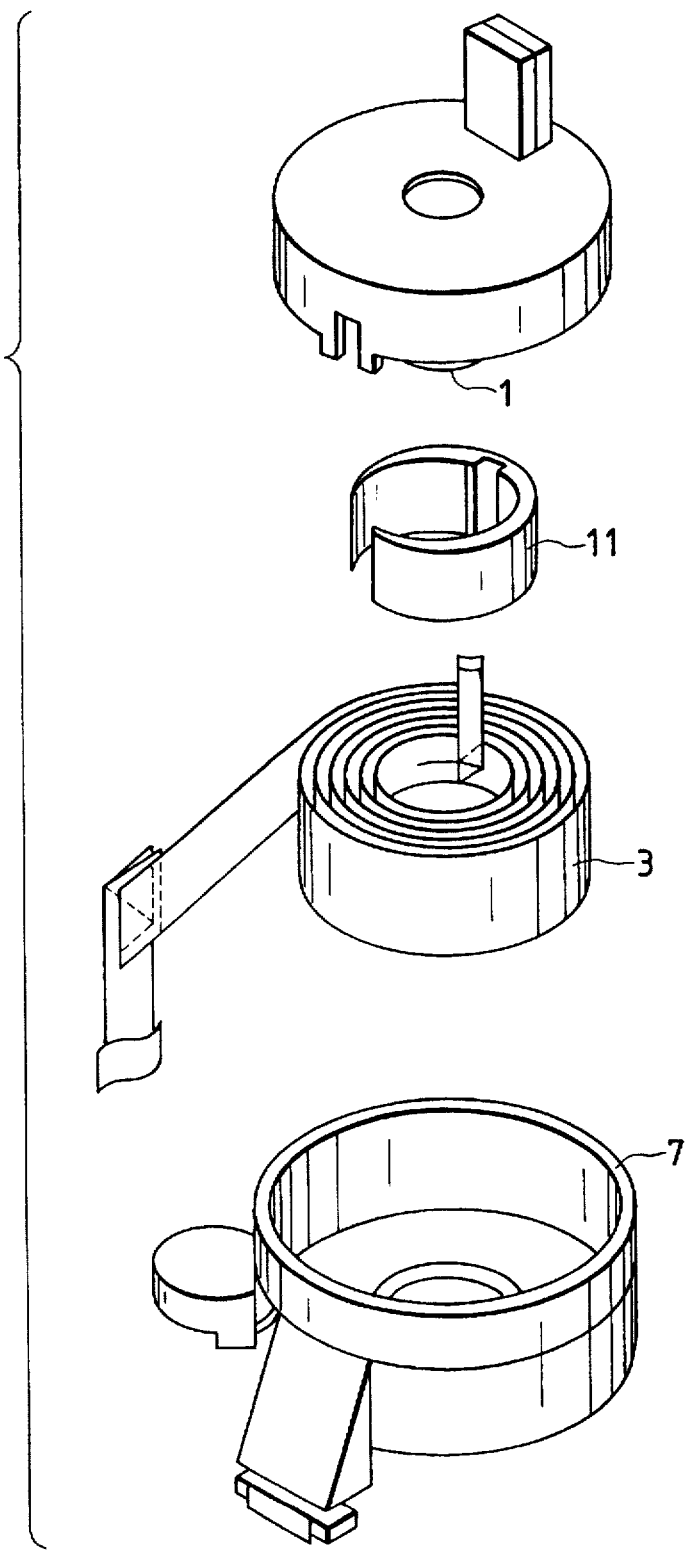
FIG. 5 is an exploded perspective view of an example of a conventional cable reel.

When the tape cable 3 stuck with the reinforcing tape 4 is installed in the inner cylinder 1, the buckling of the tape cable 3 can be prevented by only a simple working of inserting the tape cable 3 between the support portion 2 and the cylindrical portion of the inner cylinder 1 together with the reinforcing tape 4. Then it is not necessary to fix the reinforcing tape 4 to the inner cylinder 1 as in convention, and it is possible to eliminate the lock member 11 shown in FIG. 5, so that the process can be simplified and the cost be reduced.

In this embodiment, the tape cable 3 wound spirally is stored in the approximately cylindrical portion of the outer cylinder 7 together with the inner cylinder 1 after the tape cable 3 is installed in the inner cylinder 1, so that the connecter portion 6 of the tape cable 3 is attached to the outer cylinder 7, and last the outer cylinder cover 8 is attached, so that a cable reel is completed.

In the obtained cable reel, the inner cylinder 1 and the outer cylinder 7 are arranged rotatably. The tape cable 3 is wound tightly or loosely by the relative rotation of the inner and outer cylinders 1 and 7 so as to absorb the rotation. As mentioned above, buckling which is apt to arise in the vicinity of the fixed portion to the inner cylinder 1 when the tape cable 3 is wound loosely is prevented by the reinforcing tape 4 the end portion of which is held between the support portion 2 and the cylindrical portion of the inner cylinder 1. It is therefore possible to reduce troubles such as breaking of the tape cable 3 or the like, so that it is possible to improve durability and reliability.

The reinforcing tape 4 may be stuck in the vicinity of the connector portion 6 of the tape cable 3 so as to prevent the buckling of the tape cable 3 in the vicinity of the connector portion 6. In this case, the reinforcing tape 4 may be stuck to the inner circumferential surface of the tape cable 3. A projection is provided in the same manner as that of the support portion 2 of the inner cylinder 1 as mentioned above, so as to hold the tape cable 3 together with the reinforcing tape 4. In addition, the reinforcing tape 4 may be stuck on either side in the vicinity of the connector portion 5 and the connector portion 6 of the tape cable 3, or effectively not on a single side but both sides.

[EXAMPLE]

A 6-core tape cable about 2 m long was used as the tape cable 3, in which the connector portion 5 and the connector portion 6 were provided at the both ends, and the reinforcing tape 4 10 cm long from the position about 5 to 6 mm away from an end portion of the connector portion 5 was stuck to the surface to be the outer circumferential surface of the tape cable 3. The reinforcing tape 4 used herein took its maximum width on the connector 5 side and was narrower on the other side. The support portion 2 was provided in such a position as to be about 10 mm away from the end portion of the connector portion 5 when the connector portion 5 was installed in the inner cylinder 1. Therefore, when the connector portion 5 of the tape cable 3 was installed in the inner cylinder 1, the reinforcing tape 4 and the tape cable 3 were locked in the position 4 to 5 mm away from the end portion of the reinforcing tape 4 by the support portion 2 and the inner cylinder 1.

In such a structure, without the support portion 2, since there was an about 5 to 6 mm section of only the tape cable 3 in the vicinity of the end portion of the connector portion 5, buckling would arise in this section easily. However, buckling in this section was prevented by the support portion 2, and buckling in the portion beyond the section could was prevented by the reinforcing tape 4, so that the buckling of the tape cable 3 could be prevented as a whole.

As is apparent from the above description, according to the present invention, a reinforcing tape having a predetermined shape is stuck in a predetermined position of a tape cable, and a supporting portion for contacting with the reinforcing tape in the vicinity of an end portion of the reinforcing tape is provided on an inner cylinder or an outer cylinder, so that only by holding the tape cable by the supporting portion and the inner or outer cylinder together with the reinforcing tape, it is not only possible to prevent buckling In the stuck portion of the reinforcing tape, but it is also possible to prevent buckling of the tape cable in the vicinity of the end portion of the reinforcing tape effectively. It is therefore possible to improve the reliability and durability of the cable reel.

Particularly when the reinforcing tape is stuck in the vicinity of an end portion of the tape cable, and the supporting portion is disposed in the vicinity of the end portion of the reinforcing tape on the end portion side of the tape cable as in the invention stated in Claim 2, the portion of the tape cable where the reinforcing tape is stuck is held by the inner or outer cylinder and the supporting portion. Therefore, it is not only possible to prevent buckling from the end portion of the tape cable till the end portion of the reinforcing tape, but it is also possible to prevent buckling of the tape cable almost perfectly in cooperation with the buckling prevention effect of the reinforcing tape, so that it is possible to improve the durability and the reliability more.

Then, a special process to lock the reinforcing tape to the inner cylinder or the like as in convention is not necessary, and only the supporting portion is used so that a lock member used conventionally can be eliminated, so that there are effects that it is possible to simple the process of assembly and reduce the number of parts, that it is possible to realize low cost, and so on.

Other than a tapered one having a constant thickness, a tapered one which is thinner gradually as goes from an end portion contacting with the projection toward the other end portion, or a tapered one which is narrower gradually toward the other end portion may be used as the reinforcing tape as in the invention stated. In this case, the rigidity in the portion contacting with the projection may be made larger so as to prevent buckling effectively, and at the same time the rigidity in the other end be smaller so as not to block the tight winding or loose winding of the tape cable.

What is claimed is:

1. A cable reel comprising:
   a housing having an inner cylinder and an outer cylinder;
   a tape cable spirally stored in said housing to absorb relative rotation by the winding tightness and winding looseness of said tape cable;
   a reinforcing tape having a predetermined shape is stuck on a predetermined position of said tape cable; and
   a supporting portion contacting said reinforcing tape in proximity with an end portion of said reinforcing tape, said supporting portion being provided on at least one of said inner cylinder and said outer cylinder;
   wherein said reinforcing tape is made of elastic material and has more rigidity than said tape cable.

2. A cable reel according to claim 1, wherein:
   said predetermined position is proximate with an end portion of said tape cable;
   said supporting portion is formed to be disposed in the vicinity of said end portion of said reinforcing tape on a side opposing said tape cable; and
   said predetermined position of said tape cable is held by said supporting portion and at least one of said inner cylinder and said outer cylinder.

3. A cable reel according to claim 2, wherein said reinforcing tape is thinner gradually as it goes from the end portion contacting said supporting portion toward the other end.

4. A cable reel according to claim 2, wherein said reinforcing tape is narrower gradually as it goes from the end portion contacting said supporting portion toward the other end.

5. A cable reel according to claim 1, wherein said reinforcing tape is thinner gradually as it goes from the end portion contacting said supporting portion toward the other end.

6. A cable reel according to claim 1, wherein said reinforcing tape is narrower gradually as it goes from the end portion contacting said supporting portion toward the other end.

7. A cable reel according to claim 1 wherein a distance between said supporting portion and at least one of said inner cylinder and said outer cylinder is larger than the total thickness of said tape cable and said reinforcing tape.

8. A cable reel comprising:
   a housing having an inner cylinder and an outer cylinder;
   a tape cable spirally stored in said housing to absorb relative rotation by the winding tightness and winding looseness of said tape cable;
   a reinforcing tape having a predetermined shape is stuck on a predetermined position of said tape cable;
   a supporting portion contacting said reinforcing tape in proximity with an end portion of said reinforcing tape, said supporting portion being provided on at least one of said inner cylinder and said outer cylinder; and
   a projection provided on at least one of said inner cylinder and said outer cylinder, said projection being provided to oppose said supporting portion, wherein said end portion of said reinforcing tape is held between said supporting portion and at least one of said inner cylinder and said outer cylinder together with said tape cable.

9. A cable reel according to claim 8, wherein:
   said predetermined position is proximate with an end portion of said tape cable;
   said supporting portion is formed to be disposed in the vicinity of said end portion of said reinforcing tape on a side opposing said tape cable; and
   said predetermined position of said tape cable is held by said supporting portion and at least one of said inner cylinder and said outer cylinder.

10. A cable reel according to claim 9, wherein said reinforcing tape is thinner gradually as it goes from the end portion contacting said supporting portion toward the other end.

11. A cable reel according to claim 9, wherein said reinforcing tape is narrower gradually as it goes from the end portion contacting said supporting portion toward the other end.

12. A cable reel according to claim 8, wherein said reinforcing tape is thinner gradually as it goes from the end portion contacting said supporting portion toward the other end.

13. A cable reel according to claim 8, wherein said reinforcing tape is narrower gradually as it goes from the end portion contacting said supporting portion toward the other end.

14. A cable reel according to claim 8, wherein a distance between said supporting portion and at least one of said inner cylinder and said outer cylinder is larger than the total thickness of said tape cable and said reinforcing tape.

* * * * *